United States Patent [19]

McMillen et al.

[11] 4,210,221
[45] Jul. 1, 1980

[54] TRANSMISSION REMOTE SHIFT SYSTEM OF THE DISCONNECT TYPE FOR A CAB-OVER CHASSIS

[75] Inventors: Russell G. McMillen; Noel E. Leitzman, both of Fort Wayne, Ind.

[73] Assignee: International Harvester Company, Chicago, Ill.

[21] Appl. No.: 962,439

[22] Filed: Nov. 20, 1978

[51] Int. Cl.² .............................................. B60K 20/04
[52] U.S. Cl. ........................... 180/77 TC; 180/89.14; 74/473 P
[58] Field of Search ............ 180/77 TC, 77 R, 89.14, 180/89.15; 74/473 P, 473 R

[56] References Cited

U.S. PATENT DOCUMENTS

| | | | |
|---|---|---|---|
| 1,485,278 | 2/1924 | Lancia | 74/473 |
| 2,250,820 | 7/1941 | Backus | 74/473 |
| 2,255,643 | 9/1941 | Beimer | 74/473 |
| 3,656,365 | 4/1972 | Kussmann | 74/473 P |
| 4,156,474 | 5/1979 | Aida | 74/473 R |

FOREIGN PATENT DOCUMENTS 2264121 7/1973 Fed. Rep. of Germany ........ 180/89.14

Primary Examiner—John P. Silverstrim
Attorney, Agent, or Firm—Raymond E. Parks; Frederick J. Krubel; F. David AuBuchon

[57] ABSTRACT

A break-away gear shifting mechanism, for use in a motor truck having a tilt cab, wherein a gear shift lever mounted inside the cab uncouples from a gear shift control shaft and the control shaft uncouples from a support bearing on the underside of the cab upon the tilting of the cab about a forward pivot axis; and reengage upon the pivoting of the cab back to an upright operating position.

4 Claims, 5 Drawing Figures

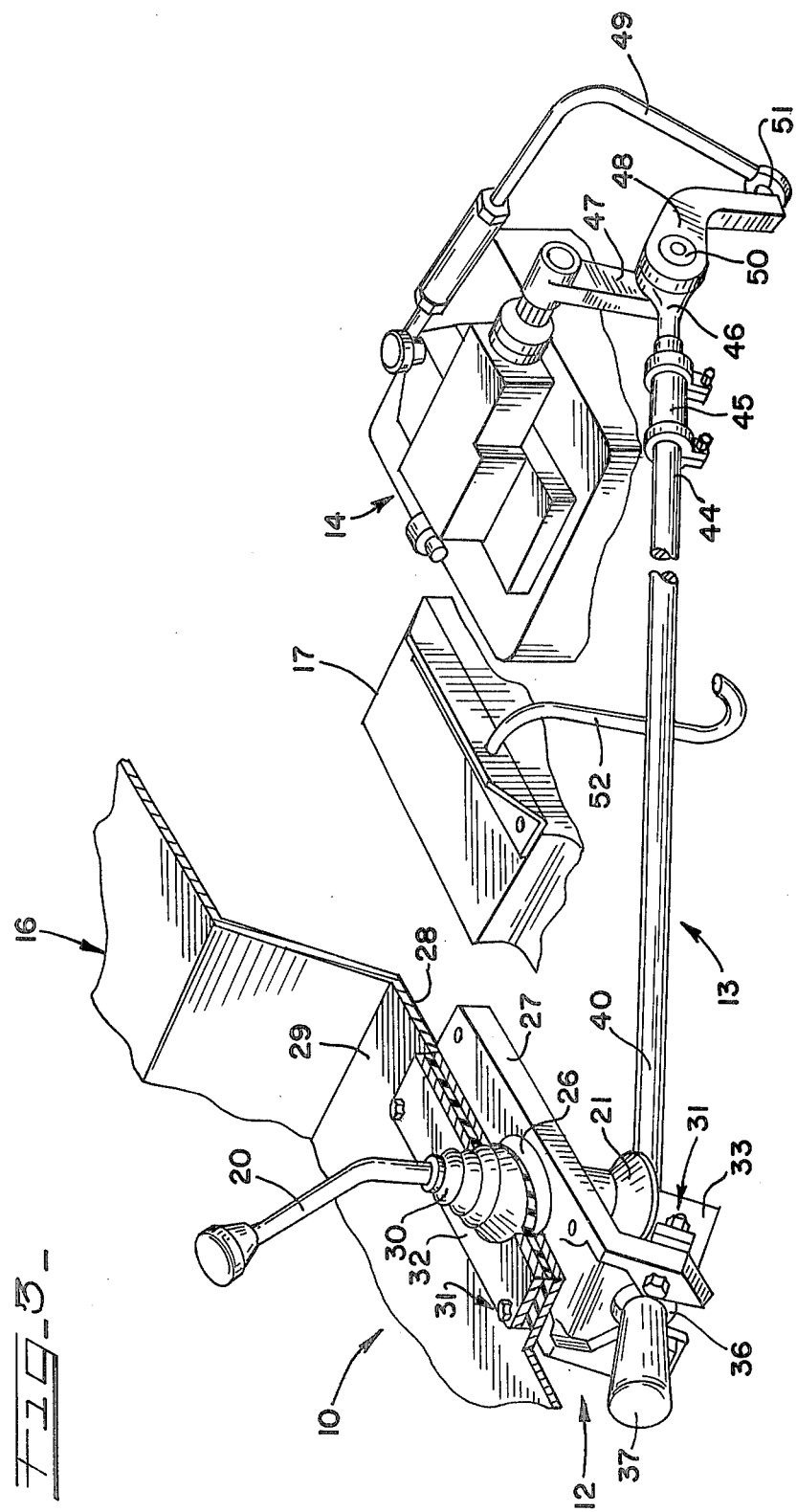

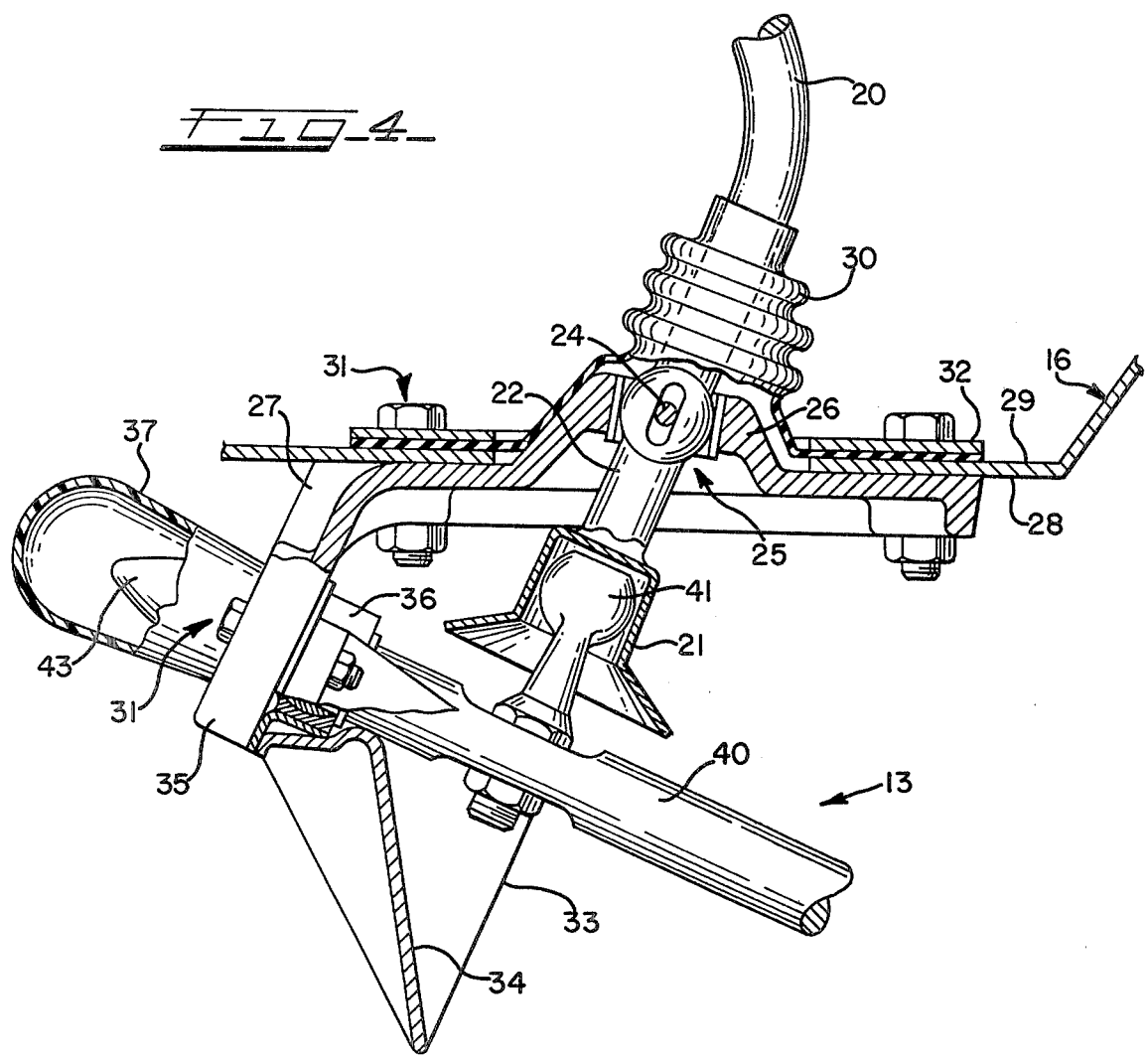

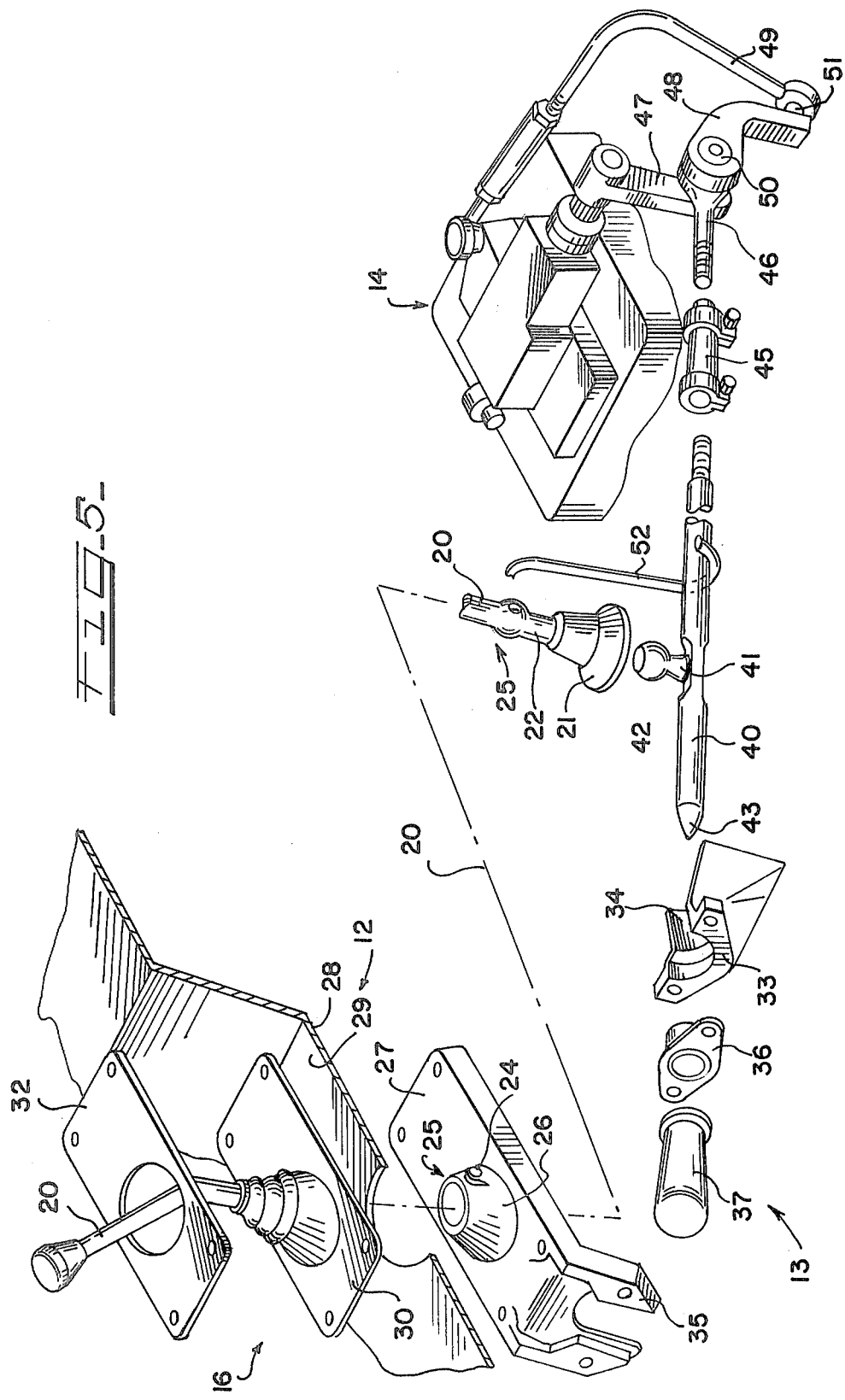

TRANSMISSION REMOTE SHIFT SYSTEM OF THE DISCONNECT TYPE FOR A CAB-OVER CHASSIS

CROSS-REFERENCE TO A RELATED APPLICATION

This patent application is a companion to a Russell G. McMillen and Noel E. Leitzman patent application entitled TRANSMISSION REMOTE SHIFT SYSTEM FOR A CAB-OVER CHASSIS, which is being filed concurrent with this patent application, under Ser. No. 962,438.

BACKGROUND OF THE INVENTION

This invention relates to a break-away gear shift assembly for use in a motor truck having a tilt cab or cab-over chassis. More particularly it relates to a gear shift lever, which is mounted to the floor of the cab and breaks away or uncouples from a gear shifting control shaft or rod upon the tilting of the cab about a forward pivot axis. The invention further concerns the gear shifting control shaft or rod, in particular a gear shifting control shaft or rod, which breaks away or uncouples from a support bearing carried on the underside of the cab simultaneously with the gear shift lever uncoupling from the control rod. Still further, the invention concerns the coupling or reengagement of the gear shift lever to the control rod and the control rod to the support bearing upon the pivoting of the cab back to an upright operating position.

FIELD OF THE INVENTION

In the early forms of trucks, the cab was placed back of the engine in about the same manner as in automobiles; that is to say, substantially over the transmission located in the rear of the engine. In order to give more room for the truck body, later designs of trucks moved the cab forward over the engine. This has brought about some complication in the gear shift arrangement. In particular with the gear shift lever, which is mounted to the floor of the tilt cab, and with the gear shifting control lever or rod which extends underneath the cab to the transmission and must be supported at opposite ends thereof by bearing and universal joint means. In Applicants' copending patent application a solution is disclosed for the gear shift lever problem by providing a telescopic control rod which has one end supported on the cab and the opposite end supported on the gear shifting mechanism. The present invention provides a solution for the problem by disconnecting the one end of the gear shifting control shaft, or rod which is supported by the underside of the cab, and simultaneously disconnecting the gear shift lever from the control rod to permit access to the engine when the cab is tilted about a forward pivot axis.

DESCRIPTION OF THE PRIOR ART

U.S. Pat. No. 3,656,365—Kussmann—Apr. 18, 1972 shows a gear shift lever having a socket at the bottom thereof, which engages with an upright ball ended shaft means pivotally mounted to a gearbox.

In U.S. Pat. No. 1,485,278—Lancia—Feb. 26, 1924 there is shown a depending ball ended gear shift lever which engages in an upwardly opening socket carried in an axially and angularly moveable gear shifting control shaft or rod, which is supported at opposite ends on the chassis.

In U.S. Pat. No. 2,255,643—Beimer—Sept. 9, 1941 there is shown a depending ball ended gear shift lever that is detachably secured to a socket carried on the engine. A gear shifting control rod is pivotally connected at one end to the gear shift lever above the depending ball end and at the other end to the transmission.

A remote control for a transmission is shown in U.S. Pat. No. 2,250,820—Backus—July 29, 1941 wherein a transfer case is mounted above the engine and a gear shift lever having a depending ball end extends into a socket in the transfer case.

None of the aforementioned prior art United States patents provides any solution to the problem of disconnecting the gear shift lever from the control rod, and disconnecting a cab supported end of the control rod from the cab upon the tilting of the cab about a forward pivot axis and the reconnection thereof upon the return of the cab to a normal upright operating position.

SUMMARY OF THE INVENTION

There is provided a gear shift lever having a depending socket end which is anchored intermediate its ends by a universal connection to the floor of the tilt cab. A ball carried on the gear shift lever, which comprises a part of the universal connection, is slotted 30 degrees above and below an anchor pin axis permitting the gear shift lever to move laterally as well as fore-and-aft. A gear shift lever support housing or tower is attached to the floor of the tilt cab and comprises another part of the universal connection. The socket end of the gear shift lever depends from the tower below the floor of the tilt cab. A rubber boot caps and protects the universal connection from the elements. Underneath the tilt cab a depending bracket is provided which supports an inclined ramp guide member and a spherical ball bushing having a round hole diametrically therethrough. An axially and angularly moveable gear shifting control rod or shaft has a free end that is slideably supported in the hole of the ball bushing. The free end is hardened and is bullet or conically shaped. The opposite end of the control rod is pivotally connected to a gear shift transmission means. A turnbuckle is provided in the control rod to adjust the effective length thereof. A spherical or ball ended upright stub shaft is provided on the control rod which engages or couples with the depending funnel shaped socket on the end of the gear shift lever. A hook or support bracket is provided on the chassis which hooks and supports the control rod once the free end slides out of the hole and is disengaged from the spherical ball bushing. The hook limits the swinging of the free end of the control rod towards the ground. As the tilt cab is pivoted about a forward axis, the funnel shaped socket on the depending end of the gear shift lever disengages from the upright ball ended stub shaft on the control rod and simultaneously the bullet shaped free end of the control rod slides out from the hole in the spherical ball bushing and down the inclined ramp of the guide member and is caught on the support hook or bracket. The hook supported control rod may not be moved in an out of way location permitting access to the engine. As the tilt cab is pivoted back to an upright operating position, the funnel shaped socket on the depending end of the gear shift lever engages with the upright ball ended stub shaft on the control rod simultaneously with the hardened bullet shaped end of the control rod sliding upwards along the inclined ramp shaped guide member and into the hole in the spherical or ball bushing. An elongated closed end cover or seal is provided over the open end of the hole in the ball bushing which has a cavity of a size to freely accept the bullet shaped end of the control rod as it is shifted in an axial direction through the ball bushing under the influence of the gear shift lever. When the gear shift system is engaged, the gear shift lever, when selecting rail positions in the transmission, causes the upright ball ended stub shaft on the control rod to rotate which in turn rotates the bullet shaped free end of the control rod in the ball bushing. A remote shift housing is associated with the transmission and is provided with a universal connection which provides a pivotal axis for the control rod at that end thereof. The gear shift lever when shifting into or out of gear also causes the ball ended stub shaft to travel in a forward and rearward direction parallel to the centerline or longitudinal axis of the control rod, with the bullet shaped free end being slideably supported in the spherical bearing and the opposite pivotally connected end being supported by a universal connection carried on the remote shift housing. The remote shift housing in consequence of the movement of the gear shift lever reacts and produces a gear engagement. All the forces in the gear shift lever system are resisted by the chassis mounted remote shift housing or through the cab itself as a result of the gear shift lever and the control rod free end support system being anchored to the cab.

As the cab is tilted about the forward pivot axis, the free end of the control rod pulls out of the spherical bearing and slides down the guide and is caught and retained by the hook bracket in a position to allow the free end of the control rod to slide up the guide and to reenter the opening in the bearing when lowering the gear shift system carried in the tilt cab. With the control rod laying in the hook bracket, the control rod can be manually lifted from the bracket and laid down along a side member of the chassis in an out of the way position for minor or major servicing of the engine, rather than unbolting and removing large parts and brackets as is the case with prior systems. When the cab is lowered, the hardened conical or bullet shape free end of the control rod comes in contact with the inclined ramped surface of the guide member and is piloted upward and sideways until the free end of the control rod starts to seek and enter the opening in the spherical bearing. Because of the geometry of the cab system as the cab is lowered, at the moment the control rod starts to enter the spherical bearing, the lower socket end of the gear shift lever comes in contact with and revolves to engage with the upright ball ended stub shaft on the control rod. As the cab continues to lower, the control rod is lifted off the hook support bracket. The free end of the control rod continues to engage the spherical bearing and the socket end of the gear shift lever completes its engagement onto the upright ball ended stub shaft. The advantages of the system are that all of the forces are applied at right angles or directly along the centerline of the control rod lessening bending moments, and, because the efforts are lower, one can use a much shorter gear shift lever which adapts to a cab package more easily. The gear shift lever being sealed at the cab is also an advantage because in tilting the cab for servicing the engine, there are no seals to part or move and thereby leak. Simplicity of the system also effects a substantial weight savings and cost savings.

BRIEF DESCRIPTION OF THE DRAWINGS

FIG. 3 is a partial detail of the gear shift system with portions of the cab broken away;

FIG. 4 is an enlarged side view showing the engagement of the gear shift lever to the gear shifting control rod and the engagement of the conical shaped free end of the control rod in the spherical bearing; and FIG. 5 is an exploded parts view of the FIG. 3 detail.

DESCRIPTION OF THE PREFERRED EMBODIMENT

Figure 1:
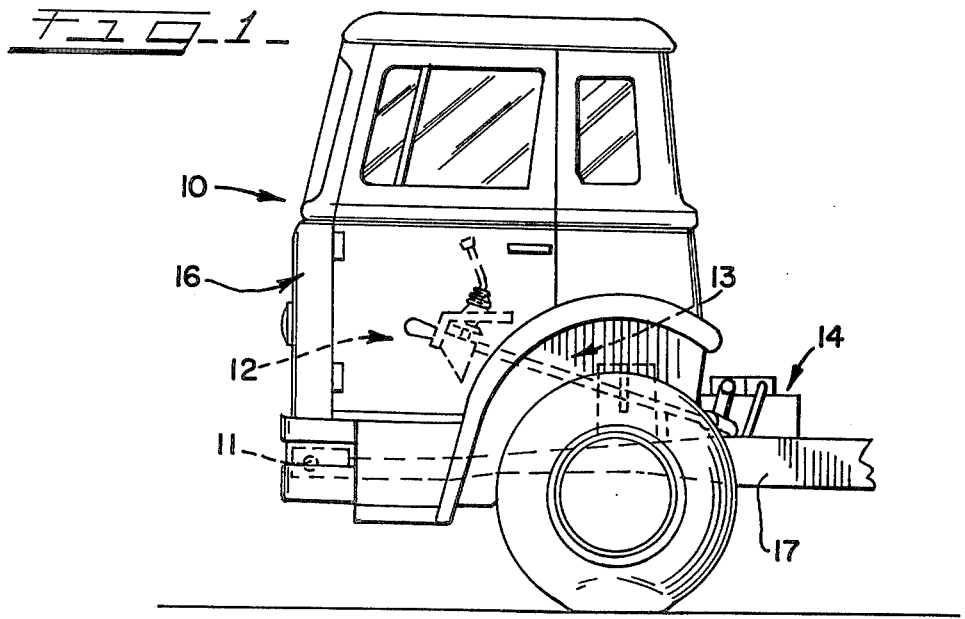
FIG. 1 shows a motor truck, chassis and a tilt cab in an upright position with a gear shift lever and gear shifting control rod in an engaged condition and connected to a remote shift housing.

In order that the invention may be readily understood and put into practical effect, reference will now be made to FIGS. 1 and 2 of the drawings wherein 10 represents a cab-over chassis type of motor truck, 11 represents the forward pivot point of the tilt cab 16, 12 represents the portion of the gear shift lever assembly which is carried in the tilt cab 16, 13 represents the portion of the gear shift assembly which is carried on the chassis of the motor truck 10, and 14 represents a remote shift housing assembly carried on the chassis 17 of the vehicle 10.

With reference now to FIGS. 3, 4 and 5 there is shown a gear shift lever 20 which is provided with a socket 21 on the lower end 22. A universal ball and socket connection 25 supports or floats the gear shift lever 20 in a tower 26 which forms a part of a bearing support housing bracket 27. The ball 23 of the universal connection 25 is provided with slots 30° above and below the axis defined by anchor pin 24 which permits a side-to-side movement of the gear shift lever 20 as well as a fore-and-aft movement. The spherical bearing housing bracket 27 is mounted to the underside 28 of the cab floor 29. A seal or boot 30 is placed over the universal connection 25 and tower 26 and is mounted to the floor 29 of the cab 16. A cover plate 32 is placed over the seal 30 and fastened by bolts and nuts 31 to the cab floor 29. A gear shifting control rod guide 33 having a modified funnel shaped or inclined ramp guiding surface 34 is connected by bolts and nuts 31 to a depending flange 35 of the housing bracket 27. A spherical or ball bushing 36 is sandwiched between the inclined ramp guide member 33 and the depending flange member 35 and an elongated closed end tubular seal 37 is sandwiched between the spherical ball bushing 36 and the depending member 35. All of the aforementioned elements comprise the portion of the gear shift lever assembly 12 which is carried on the tiltable cab structure 10.

We will now describe the elements which comprise the portion of the gear shifting assembly 13 carried on the chassis 17.

There is provided a gear shifting control rod 40 which carries an upright ball-ended stub shaft 41. The control rod 40 has a bullet or conical shape free end 43 which is machined and sized and hardened in that area to have a slip fit tolerance with the spherical or ball bushing 36. The other end 44 of the control rod 40 is connected to a turnbuckle 45 which in turn is connected to an eye bracket 46. The eye bracket 46 is universally mounted at 50 to a rock arm 47 of the remote shaft housing assembly 14. A bracket arm 48 is also universally connected at 50, to rock arm 47, and at 51 to a second rock arm 49 of the remote shift housing assembly 14. It is obvious that the control rod 40 can move fore-and-aft in the spherical bearing 36, about the axis of the first rocker arm 47, and swing or rotate in the spherical bearing 36, about universal connection 50, thereby swinging the second rocker arm 48 in a transverse direction to the longitudinal axis of the control rod 40; and that the effective length of the control rod 40 can be adjusted by turning the turnbuckle 45. A hook bracket 52 is mounted to the chassis 17 and supports the control rod 40 upon disengagement of the conical shaped free end 43 from the spherical or ball bushing 36.

BRIEF DESCRIPTION OF THE OPERATION

Figure 2:
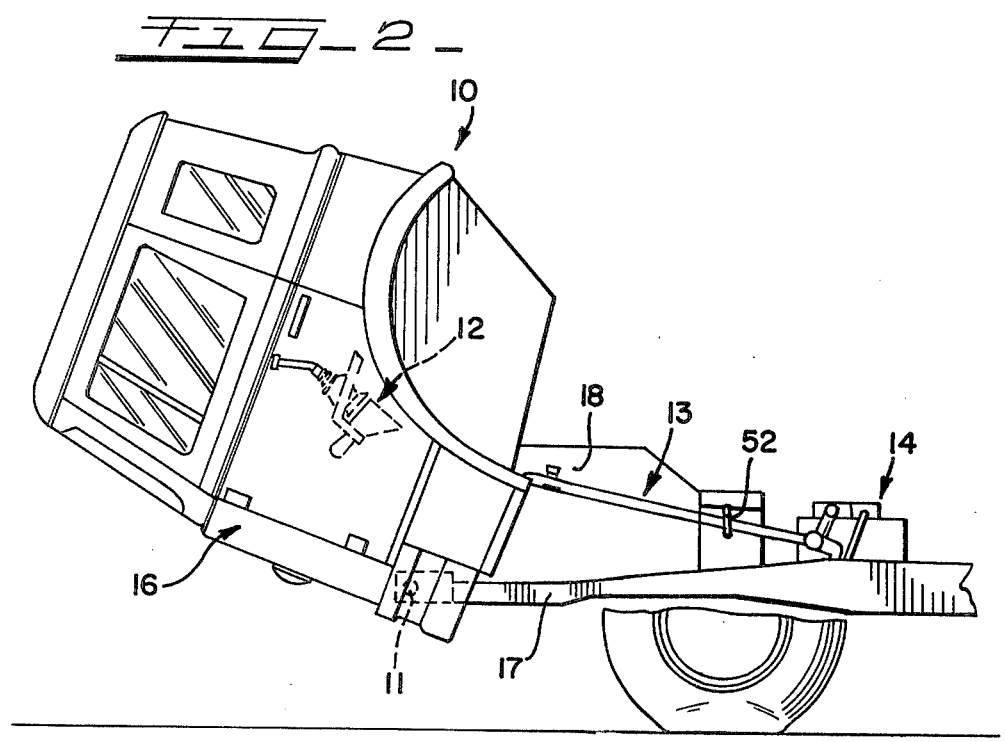
FIG. 2 shows the same cab tilted about a forward pivot axis with the gear shift lever disengaged from the gear shifting control rod and the gear shifting control rod disengaged from a spherical bearing on the cab and supported by a hook bracket on the chassis.

When it becomes necessary to service the engine 18 of the vehicle 10, the cab 16 is tilted, from the upright position in FIG. 1, forward about the axis 11, to the inclined position shown in FIG. 2. The depending socket end 21 of the gear shift lever 20 disengages from the ball-ended stub shaft 41 on the control rod 40 and simultaneously the bullet or conical shaped free end 43 of the control rod slides out from the spherical bushing 36 and slides down the ramp surface 34 of the guide member 33 and thereafter the control rod 40 drops into the hook bracket 52 and is supported thereby. When the cab 16 is pivoted back from the tilted position shown in FIG. 2 to the upright position shown in FIG. 1, the bullet or conical shaped end 43 of the control rod comes into contact with the ramped surface 34 of the right conoid shaped guide 33 and is piloted upwards and sideways until the tip 43 of the control rod 40 starts to seek and enter the spherical bearing 36. Because of the geometry of the cab system as it lowers, at the moment the tip 43 of the control rod 40 starts to enter the spherical bearing 36, the depending socket end 21 of the gear shift lever 20 comes into contact with and revolves to engage with the upright ball-ended stub shaft 41. As the cab 16 continues to lower, the control rod 40 is lifted off the hook bracket 51 and continues to engage the spherical bearing 36 and the socketed end 21 of the gear shift lever 20 completes its engagement onto the ball-ended stub shaft 41.

What is claimed is:

1. A break-away gear shift lever assembly for use in combination with a tilt cab pivotally mounted along a forward transverse axis to a chassis of a motor truck, comprising:
   a three part coupling means having one part carried on a depending end of a gear shift lever, the one part engageable with an upwardly projecting second part carried on an axially and angularly movable elongated control rod, the control rod extending underneath the tilt cab and having a free end, and a third part carried underneath the tilt cab and engageable with the free end of the control rod;
   the one part disengageable from the second part and the free end of the control rod disengageable from the third part upon tilting of the tilt cab about the forward transverse axis.

2. A break-away gear shift lever assembly according to claim 1 wherein the one part of the coupling means is a funnel shaped socket on the end of the gear shift lever depending underneath the tilt cab, the second part is an upright ball-ended stub shaft mounted to the control rod and is engageable in the socket, and the third part is a right conoid shaped guide member mounted underneath to the cab and carrying a spherical bushing at the converging end of the conoid, and the free end of the control rod slidable along the conoid and engageable in the spherical bushing.

3. A break-away gear shift lever assembly according to claim 2 wherein a bracket having a hook portion is mounted to the chassis, the hook portion positioned to catch the control rod upon disengagement of the free end from the spherical bushing and the ball-ended stub shaft from the socket concurrent with the sliding of the free end along the conoid and dropping at the diverging end of the conoid.

4. A break-away gear shift lever assembly according to claim 2 or 3 and further including a gear shift-lever housing having a bracket depending underneath the tilt cab to which the spherical bushing and the right conoid shaped guide member are attached and having a tower structure projecting into the tilt cab and pivotally supporting the gear shift lever,
   a boot seal sleeved over the tower structure and mounted to the cab; and
   an elongated closed-end seal carried on the spherical bushing and having a cavity of a size permitting the insertion of the conical shaped free end of the control rod therein.

* * * * *